(12) United States Patent
Schottler (10) Patent No.: US 7,975,939 B2
(45) Date of Patent: Jul. 12, 2011

(54) BOOM ASSEMBLY FOR A HOSE DRAG SYSTEM

(75) Inventor: Tom Schottler, Somerset, WI (US)

(73) Assignee: Tom Schottler, Somerset, WI (US)

( * ) Notice: Subject to any disclaimer, the term of this patent is extended or adjusted under 35 U.S.C. 154(b) by 10 days.

(21) Appl. No.: 12/386,544

(22) Filed: Apr. 20, 2009

(65) Prior Publication Data

US 2010/0263578 A1   Oct. 21, 2010

(51) Int. Cl.
| | |
|---|---|
| *B05B 1/20* | (2006.01) |
| *B05B 3/00* | (2006.01) |
| *B05B 3/18* | (2006.01) |
| *B05B 7/32* | (2006.01) |
| *B05B 9/00* | (2006.01) |

(52) U.S. Cl. ........ 239/147; 239/175; 239/176; 239/748; 239/337

(58) Field of Classification Search .......... 111/118–129, 111/200, 900; 239/146, 147, 172, 175, 176, 239/722, 743, 748, 302, 337
See application file for complete search history.

(56) References Cited

U.S. PATENT DOCUMENTS

| | | | | |
|---|---|---|---|---|
| 2,928,367 | A | * | 3/1960 | McCormick .................. 114/245 |
| 6,427,612 | B1 | | 8/2002 | Huffman |
| 7,252,043 | B2 | | 8/2007 | McLeod |
| 7,404,365 | B2 | | 7/2008 | McLeod |
| 2007/0199487 | A1 | | 8/2007 | McLeod |
| 2007/0234941 | A1 | * | 10/2007 | McLeod ........................ 111/121 |

OTHER PUBLICATIONS

PCE Equipment—Applicator Bars, http://www.puckenterprises.com/Equipment/AppBars.html, visited Dec. 30, 2008 (2 pages).
G. Grabow et al., "Hose Drag Systems for Land Application of Liquid Manure and Wastewater," from North Carolina Cooperative Extension Service, date unknown (pp. 1-8).

* cited by examiner

*Primary Examiner* — Christopher J. Novosad
(74) *Attorney, Agent, or Firm* — Kinney & Lange, P.A.

(57) ABSTRACT

An apparatus for application of a liquid or liquid-solid solution to soil includes an articulating tractor, a frame, a pivot point, a boom and a drag hose. The articulating tractor has a front portion and a rear portion connected to an articulation point. The rear portion has a rear wheel axle. The frame is adapted to mount on the rear portion of the articulating tractor. The frame has a front frame end located between the rear wheel axle and the articulation point. The pivot point is on the front frame end and positioned about 12 inches or more from the rear wheel axle. The boom pivotally attaches to the pivot point. The drag hose has a distal end in fluid communication with a source of liquid or solid-liquid solution and a proximal end coupled to the boom.

22 Claims, 5 Drawing Sheets

BOOM ASSEMBLY FOR A HOSE DRAG SYSTEM

BACKGROUND

Wastewater, including liquid and liquid-solid manure and municipal and industrial wastewater is a valuable source of nutrients for agriculture. For example, wastewater is a good resource of nitrogen. For a consistent yield and ascetics, the wastewater preferably is evenly distributed over the land. Because of the high nutrient concentration of wastewater, non-uniform application can result in an unequal growth distribution in the field.

Over the years many different methods and machines have been developed to more efficiently and effectively apply wastewater to land and agricultural fields. In some applications, a tractor pulls a wagon or similar apparatus containing the wastewater for application. In other applications, a tractor is connected to a source of wastewater by a long hose. This type of application is known as a hose drag system.

In a hose drag system, wastewater is pumped from a storage facility or lagoon through a flexible woven hose to a tractor that distributes the wastewater over land. The hose can be long enough to allow land application of the wastewater many miles from the storage site. A hose drag system eliminates transferring the wastewater from a storage facility to a wagon for application, thus, reducing the application time.

Wastewater can be land applied using several different techniques. First, the wastewater can be broadcast on the surface of the soil, and then optionally worked into the soil. Another method includes injecting or knifing the wastewater into the ground. A further method includes mixing the wastewater with the soil during aeration or tillage of the soil. Benefits of hose drag systems include reduced odor, increased availability of nitrogen to the plants, decreased soil compaction, and reduced application time.

To further reduce the time required for application, the flow rate through the hose drag system can be increased. A higher flow rate through the hose delivers more wastewater per minute to the applicator, allowing the field speed to be increased while maintaining the same application rate. Removing or reducing flow impediments in the system improves the flow rate through the system. For example, a tractor usually pulls the hose of a hose drag system in a serpentine-shaped pattern across the field to avoid kinking the hose. The hose is flexible and forms smooth "S" shaped curves at the end of rows. The smooth curves reduce impediments to the fluid flow.

In order to further reduce application time, an improved hose drag system for the application of wastewater is necessary.

SUMMARY

An apparatus for application of a liquid or liquid-solid solution to soil includes an articulating tractor, a frame, a boom and a drag hose. The articulating tractor has a front portion and a rear portion. The front portion and the rear portion are connected to an articulation point that allows articulated movement of the front portion and the rear portion in relation to one another. The rear portion has a rear wheel axle and the front portion has a front wheel axle. The frame is adapted to mount on the rear portion of the articulating tractor. The frame has a front frame end and a rear frame end. The front frame end is located between the rear wheel axle and the articulation point. The rear frame end is located opposite the frame front end and rearward of the rear wheel axle. The front frame end includes a pivot point positioned about 12 inches or more from the rear wheel axle. The boom pivotally attaches to the pivot point so that the boom can pivot along a substantially horizontal plane about a vertical axis. The drag hose has a distal end and a proximal end. The distal end is in fluid communication with a source of liquid or solid-liquid solution, and the proximal end is coupled to the boom.

BRIEF DESCRIPTION OF THE DRAWINGS

It is noted that the figures are not to scale.

DETAILED DESCRIPTION

Figure 1:
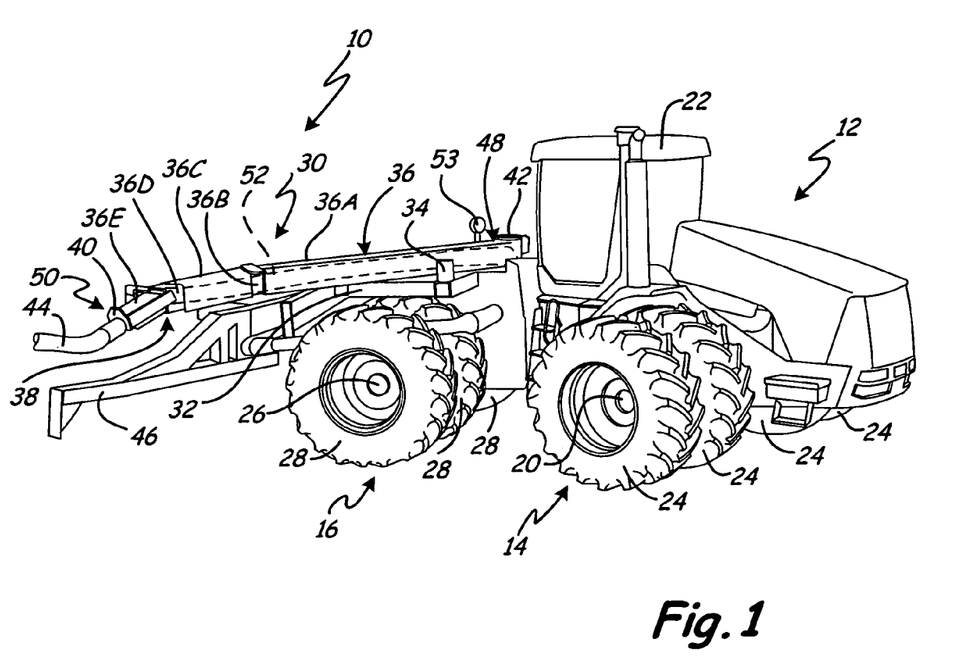
FIG. 1 is a perspective view of a hose drag system having a boom assembly.

FIG. 1 is a perspective view of hose drag system 10 which includes articulating tractor 12 (including front portion 14, rear portion 16, articulation point 18 (shown in FIG. 2), front axle 20, cab 22, front tires 24, rear axle 26 and rear tires 28), boom assembly 30 (which includes frame 32, stops 34, boom 36, knuckle 38, tow yoke 40 and pivot point 42), hose 44 and applicator assembly 46. Boom assembly 30 and applicator assembly 46 mount to tractor 12. Hose 44 attaches to boom assembly 30. In use, wastewater is pumped from a storage facility, such as a lagoon, through hose 44 to boom assembly 30 for land application. Applicator assembly 46 follows tractor 12 and assists in the application process.

Articulating tractor 12 is a four-wheel drive tractor or quad-trac machine having two halves, front portion 14 and rear portion 16. Front portion 14 and rear portion 16 are joined at articulation point 18 (shown in FIG. 2) so that front portion 14 and rear portion 16 articulate or move relative to each other. Front portion 14 includes front axle 20 and cab 22. Front tires 24 mount on front axle 20. The number and size of front tires 24 can be varied depending on the field conditions. In one example, articulating tractor 12 has dual front tires 24. Weights can also be added to front axle 20. Cab 22 is located behind front axle 20 and forward of articulation point 18. Cab 22 provides a sheltered environment for an operator of articulating tractor 12.

Rear portion 16 of articulating tractor 12 includes rear axle 26. Rear axle 26 is located behind or aft of articulation point 18. Rear tires 28 mount on rear axle 26. The number and size of rear tires 28 can be varied depending on the field conditions. In one example, articulating tractor 12 has dual rear tires 28.

Boom assembly 30 mounts on rear portion 16 of articulating tractor 12, and includes boom 36, which is supported by frame 32. Frame 32 mounts to the top surface of rear portion 16. Boom assembly 30 has a low profile and minimally affects visibility out the rear of cab 22. This allows the operator in cab 22 to observe the operation of the equipment behind cab 22, such as boom assembly 30 and applicator assembly 46.

Boom 36 includes forward end 48 and aft end 50. Forward end 48 connects to pivot point 42, and aft end 50 connects to hose 44. Boom 36 pivots about pivot point 42 while sliding or rolling over the top surface of frame 32. Stops 34 are placed on either side of frame 32 to limit the radial movement of boom 36 as explained further below.

One end of hose 44 attaches to aft end 50 of boom assembly 30 and a second end of hose 44 is in fluid communicate with a source of wastewater. Wastewater is pumped from a storage facility, such as a lagoon or supply station, to boom 36 through hose 44. In one example, a centrifugal pump is used to pump the wastewater from the storage facility through hose 44. Hose 44 extends from the storage facility to the tractor 12. Tractor 12 pulls hose 44 back and forth across the field during the application process. Hose 44 can be several miles long, allowing the wastewater to be applied many miles from the storage facility. Hose 44 is a flexible woven hose. The outside of hose 44 is abrasion resistant to reduce wear on hose 44 from objects on the ground. For example, rocks and sticks can rub on hose 44, causing wear and increasing maintenance on hose 44. The diameter of hose 44 depends on several factors such as the wastewater properties and the pumping equipment used. In one example, hose 44 has an inner diameter of about 12.7 cm (5 inches), about 15.2 (6 inches) or about 20.3 (8 inches). However, hose 44 can have any suitable diameter.

Inner hose 52 attaches to hose 44 and extends the length of boom 36 for transporting wastewater through boom 36. Hose 44 attaches to inner hose 52 at aft end 50 of boom 36. In one example, inner hose 52 connects to hose 44 by a disconnectable connector so that hose 44 can be disconnected from inner hose 52. In one example, inner hose 52 has an inner diameter equal to the inner diameter of hose 44. Inner hose 52 is flexible so that it conforms to the shape of boom 36, reducing impediments to the flow of wastewater.

Tow yoke 40 assists in attaching hose 44 to aft end 50 of boom assembly 30. Tow yoke 40 maintains hose 44 in fluid communication with inner liner 52 so that wastewater flows from hose 44 to inner hose 52. Tow yoke 40 can be a hinged assembly to allow quick connection of hose 44 and inner hose 52.

Boom 36 comprises five boom segments, first boom segment 36A, second boom segment 36B, third boom segment 36C, fourth boom segment 36D and fifth boom segment 36E. The segmented design of boom 36 provides vertical and horizontal freedom, and assists in improving the fluid flow rate through system 10, as described further below. Boom 36 is formed from a durable material such as steel or another metal. Boom 36 protects inner hose 52 from ultra-violet light (UV) damage from sunlight. Boom 36 also protects inner hose 52 from other types of damage from exposure such as cuts and abrasions.

Second, third, fourth and fifth boom segments 36B, 36C, 36D and 36E, respectively, form knuckle 38. Knuckle 38 gives boom 36 additional vertical and horizontal freedom as described further below with regards to FIGS. 4A and 4B. Knuckle 38 is configured to permit select boom segments to pivot. Each pivotable boom segment is limited so that an angle greater than about 30° from center cannot be formed. Inner hose 52 extends through knuckle 38 and conforms to the shape of knuckle 38 such that knuckle 38 affects the flow path of wastewater through boom 36. Because the fluid flow rate decreases every time the wastewater changes direction, with sharper angles, such as 90° angles, causing more impedance to fluid flow, the gradual flow path changes created by knuckle 38 improves the fluid flow rate.

Boom 36 must be long enough to clear rear tires 28 and applicator assembly 46. In one example, first boom segment 36A is about 345.4 cm (136 inches) long and applicator assembly 46 is about 731.5 cm (288 inches) wide. In another example, first boom segment 36A is about 711.2 cm (280 inches) long and applicator assembly 46 is about 1,524 cm (600 inches) wide.

Tractor 12 can exert more force on hose 44 than hose 44 can withstand. When there is too much force on hose 44, hose 44 tears or breaks free from boom 36. Thus, the operator must monitor the force on hose 44. A tow gauge, such as the one illustrated in FIG. 5, can be used to measure the force on hose 44. The reading from the tow gauge can be displayed on tow gauge display 53 for the operator of system 10 to monitor. Alternatively, the reading from the tow gauge can be displayed on a display mounted in cab 22. The tow gauge allows the operator to adjust to field towing conditions of drag hose system 10 so that the force on hose 44 is within acceptable limits. Because field conditions affect resistance on hose 44, different field conditions will affect the amount of force on hose 44. Further, the tow gauge can also be used to monitor the remaining available length of hose 44. As hose 44 is extended to its full length, hose 44 tow becomes taut and the tow gauge indicates an increased, fluctuating force on hose 44.

Applicator assembly 46 extends from rear portion 16 articulating tractor 12, and carries a device to work the wastewater into the land. For example, applicator assembly 46 can carry an opener such as discs, cultivator shovels or narrow knives. In use, wastewater flows through hose 44 to boom assembly 30 and is applied to the land by an applicator, such as a splash box (shown in FIG. 3) and applicator assembly 46. The splash box deflects the manure and creates a distribution pattern. In one example, discs on applicator assembly 46 follow behind the applied wastewater, and work the wastewater into the land. Alternatively, instead of applicator assembly 46, tractor 12 can surface apply the wastewater without further working the wastewater into the land or tractor 12 can carry an injection applicator or a drop hose applicator. Both injection applicators and drop hose applicators apply the wastewater to the soil without a splash box. Injection applicators place the manure directly into the soil. Drop hose applicators use a plurality of hoses extending from a boom to place the wastewater into the soil. Drop hose applicators allow the wastewater to be applied closer to the soil surface. These and other application techniques benefit from the configuration of boom assembly 30, and boom assembly 30 can be used regardless of the application technique used.

The width of applicator assembly 46 depends on several factors including physical capabilities of articulating tractor 12 and the volumetric flow rate of wastewater. Increasing the width of applicator assembly 46 typically increases its weight, which affects the balance of weight between front portion 14 of tractor 12 and rear portion 16 of tractor 12. If applicator assembly 46 is too heavy, the weight of rear portion 16 will be greater than the weight of front portion 14, causing front portion 14 to lose traction. In some circumstances, weights can be added to front axle 20 to balance the weight of front portion 14 and rear portion 16. Further, tractor 12, and more specifically rear axle 26, must be able to support the weight of applicator assembly 46.

The width of applicator assembly 46 also depends on the flow rate of wastewater. In order to provide consistent, uniform application, applicator assembly 46 should have about the same width as the distribution pattern of the wastewater. Wider distribution patterns are achieved at higher flow rates. A wider applicator assembly 46 and distribution pattern are preferable because more land is covered in each pass, reducing the number of passes required for application. Reducing the number of passes or trips across a field reduces the application time and reduces the wear on hose 44. Although the outside of hose 44 is abrasion resistant, rocks, stones, sticks and other sharp objects present in the field accelerate wear on hose 44 and increase maintenance. Reducing the number of passes reduces potential contact with such objects. Further details of hose drag system 10 and boom assembly 30 are shown in FIG. 2.

Figure 2:
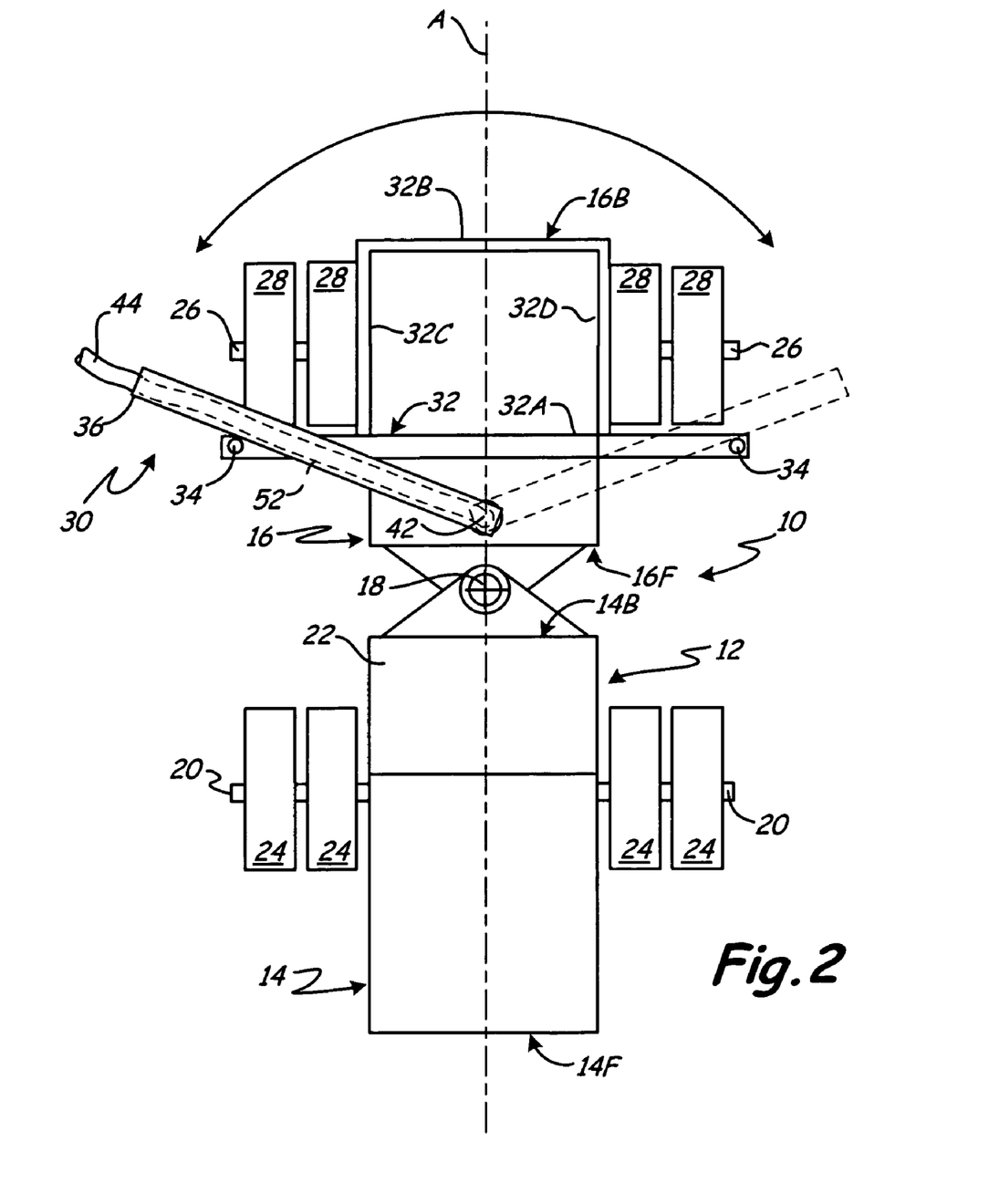
FIG. 2 is a block diagram illustrating the hose drag system of FIG. 1 from a top view.

FIG. 2 is a top block view of hose drag system 10 having boom assembly 30, which includes boom 36, stops 34 and frame 32 (which includes first beam 32A, second beam 32B, third beam 32C and fourth beam 32D). In FIG. 2, applicator assembly 46 is not shown for clarity. Frame 32 mounts on rear portion 16 of tractor 12 and supports boom 36 as boom 36 moves or rolls over the top surface of frame 32. First beam 32A, second beam 32B, third beam 32C and fourth beam 32D assemble to form frame 32. Frame 32 can be mounted on an articulating tractor 12 available on the market, such as a Case STX 375 tractor. Although frame 32 is illustrated having a square-shape, frame 32 can have any shape such that frame 32 provides sufficient support for boom 36. In one example, beams 32A-32D are hollow steel beams that are welded to form frame 32.

Stops 34 vertically extend from frame 32 to limit the motion of boom 36. Stops 34 are placed on either side of frame 32 to limit the radial movement of boom 36. Stops 34 prevent boom 36 from interfering with or hitting cab 22. Stops 34 should be positioned to prevent boom 36 from hitting cab 22 during turning. In one example, stops 34 are positioned to allow boom 36 to pivot about 70° from either side of Axis A, for a total rotation of about 140°. Stops 34 also control the angle between boom 36 and tractor 12 so that hose 44 does not fall in the path of tractor 12. Stops 34 must be strong enough to stop boom 36 when boom 36 is in motion. In one example, stops 34 include an elastomeric material, such as rubber, to soften the interaction or collision between stops 34 and boom 36.

Boom assembly 30 works with the articulation of articulating tractor 12, and improves the handling and maneuverability of hose drag system 10. Front portion 14 of tractor 12 includes forward end 14F and rear end 14B, and rear portion 16 of tractor 12 includes forward end 16F and rear end 16B. In use, boom 36 radially pivots about pivot point 42 at forward end 16F of rear end 16. For example, boom 36 pivots about pivot point 42 when tractor 12 turns. Boom 36 pivots along a substantially horizontal plane about a vertical axis at pivot point 42. The radial movement of boom 36 prevents damage to hose 44, such as kinking, and reduces impediments to the fluid flow.

Pivot point 42 is located such that tractor 12 maintains control over hose 44, even during turning. Pivot point 42 is located forward of rear axle 26, between rear axle 26 and articulation point 18. In one example, pivot point 42 is about 30.5 cm (12 inches) or more forward of rear axle 26. In another example, pivot point 42 is about 40.6 cm (16 inches) or more forward of rear axle 26. In a further example, pivot point 42 is closer to articulation point 18 than to rear axle 26. The center of gravity for articulating tractor 12 with applicator assembly 46 is approximately at articulation point 18.

Locating pivot point 42 near articulation point 18 and the center of gravity of tractor 12 (with applicator assembly 46) enables tractor 12 to maintain control of hose 44 during turning. The location of pivot point 42 improves control of hose drag system 10 because hose 44 and boom assembly 30 shift and assist with turning. The weight of hose 44 can burden articulating tractor 12, especially when turning. When boom 36 is connected to articulating tractor 12 at a location about equal with or behind rear axle 26, tractor 12 cannot maintain control of hose 44 and boom assembly 30. At such a location, boom assembly 30 does not pivot at the same rate as rear portion 16 turns. Instead, the mass of hose 44 acts against the turning movement of articulating tractor 12 and produces considerable back pull on tractor 12. When boom 36 is connected to articulating tractor 12 at a location about equal with or behind rear axle 26, hose 44 controls the movement of tractor 12.

By moving pivot point 42 forward of rear axle 26 and closer to articulation point 18 and the center of gravity of tractor 12 (with applicator assembly 46), tractor 12 maintains control of hose 44 during turning. Because of the location of pivot point 42, boom 36 swings into the turn so that the mass of boom 36 and hose 44 act in the same direction as tractor 12 and assist with turning. This location of pivot point 42 makes it easier to turn hose drag system 10, improving the handling and maneuverability of hose drag system 10. The improved handling and maneuverability of hose drag system 10 is a function of the distance between pivot point 42 and articulation point 18. The closer pivot point 42 is located to articulation point 18, the more improved the handling and maneuverability of hose drag system 10.

The location of articulation point 42 also eliminates the need to make Y-turns. Y-turns involve pulling the tractor forward at a corner or end of a field, reversing to create slack in hose 44 and then continuing forward. Y-turns involve repeated hurried or rushed reversing that is hard on the transmission of the tractor. They also are time consuming and require additional operator concentration. Further, Y-turns cause puddling at the turn locations because of the increased time spent at these locations. To reduce the amount of puddling, systems requiring Y-turns are typically operated at lower flow rates than otherwise are required. The improved handling of hose drag system 10 and the location of pivot point 42, enables system 10 to maintain forward movement throughout a turn; Y-turns are not necessary with system 10. Eliminating necessary Y-turns at the end of each row allows system 10 to be operated at higher flow rates because puddling during turning is reduced or eliminated. Further, elimination of Y-turns in hose drag system 10 reduces wear on the tractor transmission and reduces application time.

The angle hose 44 forms with Axis A of articulating tractor 12 also affects the operation of hose drag system 10. In practice, hose 44 is typically towed by tractor 12 in a serpentine-shaped pattern across a field so that smooth S-shaped curves are formed at the end of each row. In a level field, at a significant distance before or after a turn, boom 36 is approximately aligned with Axis A of tractor 12. As tractor 12 turns, boom 36 pivots about pivot point 42 in the direction of the turn. If hose 44 forms too large of angle with Axis A, it will fall in the path of tractor 12, which can result in tractor 12 driving over and damaging hose 44. Knuckle 38 can additionally control the path of hose 44 during turns. By providing additional degrees of freedom, knuckle 38 assists in optimizing the angle hose 44 forms with Axis A. Knuckle 38 also enables additional slack in hose 44 during turning. During a turn, various boom segments of knuckle 38 can pivot to reduce the tautness of hose 44. Knuckle 38 enables hose 44 to form smooth curves at turns, and prevents pinching or kinking of hose 44 and inner hose 52. Thus, knuckle 38 reduces impediments to flow and increases the fluid flow rate through hose 44.

Figure 3:
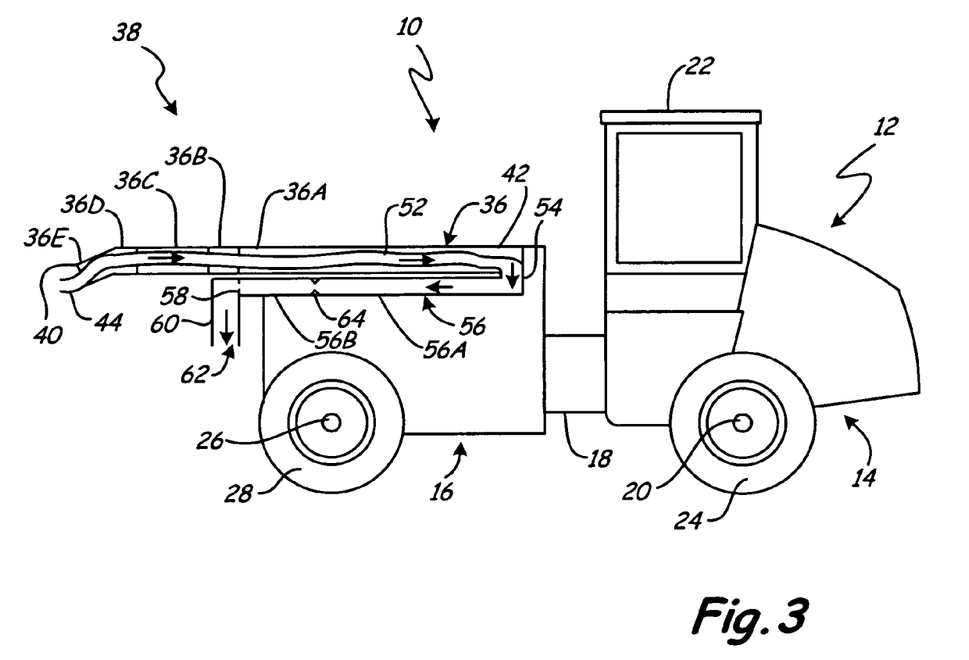
FIG. 3 is a simplified cross-sectional view illustrating the flow of wastewater through the hose drag system of FIG. 1.

FIG. 3 is a cross-sectional view of hose drag system 10 illustrating the flow of wastewater through the system which includes, boom 36 (having inner hose 52), vertical pipe 54, horizontal pipe 56 (including first portion 56A and second portion 56B), nozzle 58, applicator or splash box 60, open bottom 62 and flow meter 64. In use, wastewater flows through hose 44 to inner hose 52 of boom 36. Inner hose 52 and hose 44 connect at tow yoke 40. Downstream (with respect to the flow of wastewater) of tow yoke 40 is knuckle 38, which is formed by second boom segment 36B, third boom segment 36C, fourth boom segment 36D and fifth boom segment 36E. Knuckle 38 provides limited vertical and horizontal movement of inner hose 52, smoothing the flow path transition from hose 44. Each boom segment of knuckle 38 cannot pivot more than about 30° from center. Thus, the wastewater flow path is limited to gradual directional changes.

After flowing through knuckle 38, the wastewater flows along a generally horizontal path through inner hose 52 until pivot point 42. At pivot point 42, the wastewater turns 90° to flow through vertical pipe 54, and then turns another 90° to flow through horizontal pipe 56 to nozzle 58. Nozzle 58 evenly distributes the wastewater across splash box 60, and splash box 60 deflects the wastewater onto the land through open bottom 62 to form a distribution pattern. In one example, nozzle 58 is a square nozzle.

Splash box 60 evenly distributes the wastewater over a width of land. It is preferable that the width of distribution is about equal to the width of applicator assembly 46. This allows all of the wastewater applied to the soil to be worked in by applicator assembly 46 and prevents adjacent distribution patterns from unintentionally overlapping.

Flow meter 64 is placed upstream of splash box 60 and downstream of vertical pipe 54. Flow meter 64 monitors the flow of wastewater through the system. In one example, flow meter 64 is an electromagnetic flow sensor. A display can be incorporated in cab 22 or in another location visible to the operator so that the application flow rate can be monitored during application. Monitoring the application flow rate allows the amount of nutrients applied to the soil to be monitored. Further, changes in the application flow rate can indicate changes in the system, such as when the system is plugged.

To ensure accuracy of flow rate measurements of flow meter 64, flow meter manufacturers generally recommend that the pipe connected to the inlet of the flow meter have a length at least equal to five times the diameter of that pipe, and that the pipe connected to the outlet of the flow meter have a length at least equal to twice the diameter of that pipe. This configuration eliminates or reduces turbulent flow through the flow meter. The location of flow meter 64 in hose drag system 10 allows such manufacturers' recommendations to be met. In one example, first portion 56A of horizontal pipe 56, which is connected to the inlet of flow meter 64, has a length equal to about eight times the diameter of horizontal pipe 56, and second portion 56B of horizontal pipe 56, which is connected to the outlet of flow meter 64, has a length equal to about four times the diameter of horizontal pipe 56.

Flow meter 64 is located between vertical pipe 54 and splash box 60 in a relatively stable, vibration-free location. This further reduces turbulence in flow meter 64. In system 10, flow meter 64 is not subjected to large, sudden movements and bumping or collision forces such as those encountered by boom 36. Flow meter 64 is also not subjected to a large amount of vibration such as applicator assembly 46. The stable location of flow meter 64 increases the accuracy and reliability of flow meter 64 and reduces potential damage or abuse to flow meter 64.

Wastewater flowing through hose drag system 10 encounters a reduced number of directional changes, and specifically a reduced number of sharp directional changes, such as right (90°) angle changes. As described above, fluid flow rate decreases every time the fluid changes directions. Hose drag system 10 contains only three 90° angle turns, one between inner hose 52 and vertical pipe 54, one between vertical pipe 54 and horizontal pipe 56 and one upon exiting horizontal pipe 56. The reduced number of directional changes in hose drag system 10 improves the fluid flow rate. Further, a sharper angle, such as a 90° angle, direction change impedes fluid flow to a greater extent than a larger, more gradual angle. Knuckle 38 pivots vertically and horizontally to gradually change the vertical and horizontal direction of the fluid flow. The gentle, gradual directional changes of knuckle 38 reduces fluid flow impediments and results in an improved fluid flow rate in system 10 compared to hose drag assemblies not containing knuckle 38.

The reduced number of 90° turns of hose drag system 10 also simplifies the cleaning process. Hose drag systems are cleaned by sending a foam pig through the line. The pig removes solid manure from system 10 and prevents small solids from agglomerating and forming large solids, which could clog system 10. The simplified piping and the reduced number of 90° angle turns in boom assembly 30 makes it easier to direct a pig through hose drag system 10.

Impediments to the fluid flow path in hose drag system 10 can be further reduced by sizing the diameter of vertical pipe 54 significantly larger than the diameters of inner hose 52 and horizontal pipe 56. Changing the flow direction of a fluid at a low flow rate is less of a flow impediment than changing the flow direction at a higher flow rate. Increasing the diameter of vertical pipe 54 relative to the diameters of inner hose 52 and horizontal pipe 56, reduces the flow rate or speed of the wastewater through vertical pipe 54 and through the two 90° angle turns between inner hose 52 and horizontal pipe 56. This provides smoother fluid flow at these turns and reduces flow impediments. In one example, vertical pipe 54 has an inner diameter at least about 5 cm (2 inches) larger than the inner diameter of inner hose 52 and horizontal pipe 56. In another example, inner hose 52 and horizontal pipe 56 have an inner diameter of about 15.2 cm (6 inches) and vertical pipe 54 has an inner diameter of about 20.3 cm (8 inches). In a further example, inner hose 52 and horizontal pipe 56 have an inner diameter of about 20.3 cm (8 inches) or less and vertical pipe 54 has an inner diameter of about 30.5 cm (12 inches) or greater.

The reduced impediments to flow, including the reduced number of 90° turns and the larger diameter of vertical pipe 54 reduce the pressure in hose 44 while increasing the fluid flow rate. Reducing the pressure has several benefits. First, hose 44 is designed to withstand a specific amount of pressure. Reducing the pressure in hose 44 drops the system further below the limits of hose 44. Additionally, reducing the pressure in hose 44 allows a smaller capacity pump to be used or enables a pump to transfer thicker material or wastewater compared to a typical drag hose system. In one example, drag hose system 10 has about a 15%-20% reduction in pressure and about a 15%-20% increase in fluid flow rate.

Figure 4A:
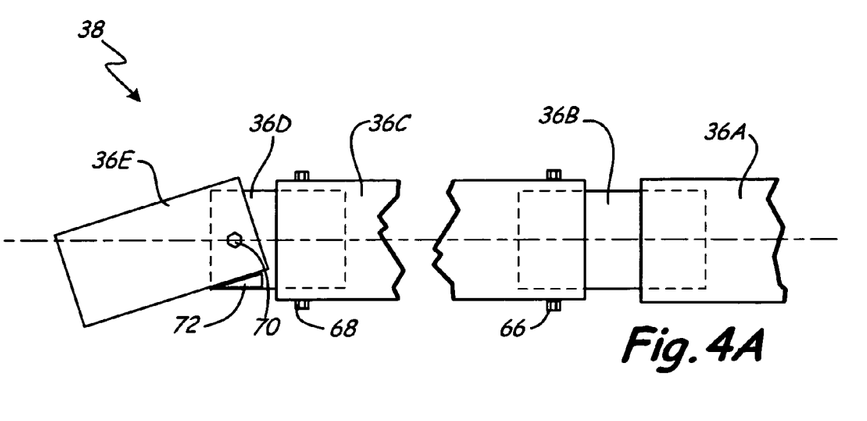
FIG. 4A is an enlarged side view of a knuckle section of the boom assembly of FIG. 1.
Figure 4B:
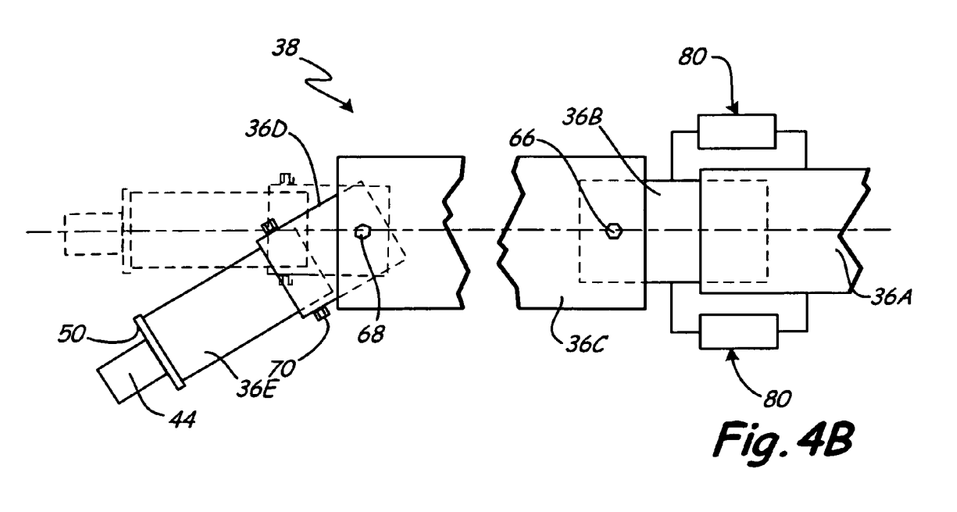
FIG. 4B is an enlarged top view of the knuckle section of FIG. 4A.

Knuckle 38 also assists in reducing flow impediments in hose drag system 10. FIGS. 4A and 4B show the details of knuckle 38; FIG. 4A is a side view of knuckle 38 and FIG. 4B is a top view of knuckle 38. Knuckle 38 includes second, third, fourth and fifth boom segments 36B, 36C, 36D and 36E, respectively, and fasteners 66, 68 and 70. Tow gauges 80 are placed on either horizontal side of knuckle 38 as shown in FIG. 4B to measure the force on hose 44.

Knuckle 38 permits selected segments of boom 36 to pivot to provide additional vertical and horizontal freedom to boom 36. As shown, second boom segment 36B and third boom segment 36C are joined by fastener 66; third boom segment 36C and fourth boom segment 36D are joined by fastener 68;

and fourth boom segment 36D and fifth boom segment 36E are joined by fastener 70. Fasteners 66, 68 and 70 can be any means for fastening two boom segments together while still allowing rotation. In one example, fasteners 66, 68 and 70 include nuts and bolts. In another example, the distance between fastener 66 and fastener 68 is about 81.3 cm (32 inches), the distance between fasteners 70 and 68 is about 21.6 cm (8.5 inches), the length of second boom segment 36B is about 88.9 cm (35 inches), the length of third boom segment 36C is about 81.3 cm (32 inches) and the length of fourth boom segment 36D is about 33.0 cm (13 inches).

Knuckle 38 is configured to permit limited vertical movement of fifth boom segment 36E about a horizontal axis. As shown in FIG. 4A, fifth boom segment 36E pivots about fastener 70 in a horizontal direction relative to fourth section 36D. In one example, fifth section 36E can pivot about 15° to about 20° from center. That is, fifth section 36E can pivot up to about 15° to about 20° up or down from fourth section 36D. Stop block 72 can be placed under fifth boom segment 36E to prevent further downward movement.

Knuckle 38 is also configured to permit limited horizontal movement of fourth boom segment 36D and third boom segment 36C about a vertical axis. As shown in FIG. 4B, fourth boom segment 36D pivots about fastener 68 in a generally horizontal direction relative to third boom segment 36C, and third boom segment 36C pivots about fastener 66 in a generally horizontal direction relative to second boom segment 36B. In one example, third section 36C can pivot about 25° to about 30° from center. In another example, fourth segment 36D can pivot about 25° to about 30° from center.

The cross-sectional dimensions of segments 36A through 36E differ in size to allow assembly and pivoting. The heights and widths of first and third boom segments 36A and 36C are larger than those of second boom segment 36B so that second boom segment 36B fits in telescoping fashion between first boom segment 36A and third boom segment 36C. The large cross-sectional difference between second boom segment 36B and third boom segment 36C allows third boom segment 36C to pivot with respect to second boom segment 36B. Further, the interference between second boom segment 36B and third boom segment 36C limits the horizontal movement of third boom segment 36C. More specifically, the width difference between second boom segment 36B and third boom segment 36C controls the range of motion of third boom segment 36C.

Third boom segment 36C also has a larger height and width than fourth boom segment 36D. Third boom segment 36C pivots horizontally with respect to fourth boom segment 36D. Third boom segment 36C receives fourth boom segment 36D such that the interference between third boom segment 36C and fourth boom segment 36D limits the range of motion of fourth boom segment 36D. More specifically, the width difference of third boom segment 36C and fourth boom segment 36D limits the horizontal motion of fourth boom segment 36D. Thus, controlling the width ratios of third boom segment 36C and fourth boom segment 36D controls the extent fourth boom segment 36D can pivot about fastener 68.

Finally, fifth boom segment 36E has a larger height and width than fourth boom segment 36D, and fifth boom segment 36E receives fourth boom segment 36D. Stop block 72 limits the downward vertical motion of fifth boom segment 36D about fastener 70.

The width ratios of second boom segment 36B and third boom segment 36C and of third boom segment 36C and fourth boom segment 36D can be controlled to maintain gradual flow path changes and to prevent sharp angles in the wastewater flow path which reduces the flow rate. In one example, first boom segment 36A is about 30.5 cm (12 inches) tall and about 30.5 cm (12 inches) wide, second boom segment 36B is about 27.9 cm (11 inches) tall and about 27.9 cm (11 inches) wide, third boom segment 36C is about 30.5 cm tall (12 inches) and about 40.6 cm (16 inches) wide and fourth boom segment 36D is about 27.9 cm (11 inches) tall and about 27.9 cm (11 inches) wide. Although first boom segment 36A through fifth boom segment 36E are illustrated having generally rectangular configurations, first boom segment 36A through fifth boom segment 36E can have any configuration so long as the width ratios of second boom segment 36B and third boom segment 36C and of third boom segment 36C and fourth boom segment 36D are maintained to allow limited pivoting of these boom segments.

Inner hose 52 extends from fifth boom segment 36E to first boom segment 36A. Inner hose 52 is flexible so that inner hose 52 bends to accommodate the pivoting of boom segments 36B through 36E. Boom 36 protects inner hose 52 from UV damage and other types of damages such as abrasion wear and cuts.

Tow gauges 80 are placed on either horizontal side of knuckle 36 as illustrated in FIG. 4B. Tow gauges 80 extend between first boom segment 36A and second boom segment 36B of boom 36 and measure the force on hose 44, as explained further below.

The vertical and horizontal flexibility of knuckle 38 smoothes the transition from hose 44 to boom 34. For example, attaching hose 44 directly to first boom segment 36A results in a sharp angle between hose 44 and boom 36, which reduces the wastewater flow rate through hose 44 and inner hose 52. In comparison, knuckle 38 smoothes the transition between hose 44 and first boom segment 36A of boom 36 such that no sharp angles are present. Instead, the flow path from hose 44 to first boom segment 36A is changed through gentle, gradual angles, resulting in an improved wastewater flow rate. The flexibility and freedom of knuckle 38 allows the wastewater flow path to be gradually adjusted to the changing vertical and horizontal orientation of boom 36, such as when boom 36 pivots. By utilizing gradual changes in direction instead of sharp changes, the wastewater flow rate is improved. Knuckle 38 also prevents kinking or otherwise damaging hose 44, which would greatly reduce the wastewater flow rate.

Knuckle 38 also provides additional slack in hose 44 during turning. During turns, the boom segments of knuckle 38 adjust or pivot to reduce the tension on hose 44. This enables hose 44 to form a smooth curve at turns, which reduces flow impediments and prevents pinching or damaging hose 44. Further, knuckle 38 is configured to prevent hose 44 from falling in the path of tractor 12. By adjusting the allowed pivoting movement of the boom segments of knuckle 38, the path of hose 44 and the angle hose 44 forms with tractor 12 during turns can be controlled.

Figure 5:
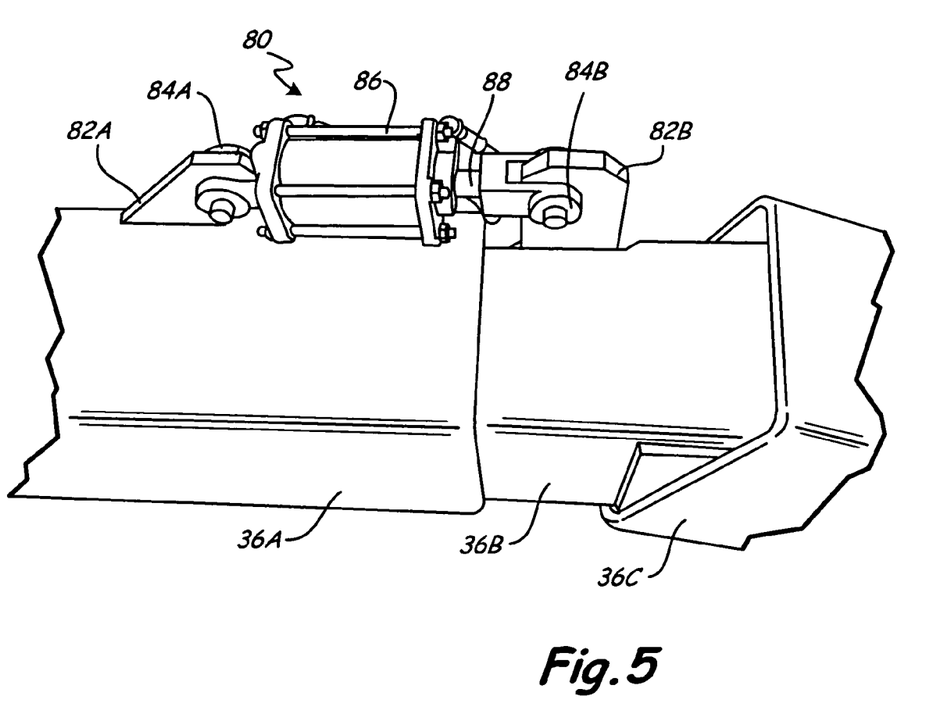
FIG. 5 is an enlarged view of a tow gauge for the hose drag system of FIG. 1.

As mentioned above, articulating tractor 12 can pull with more force than hose 44 can withstand. Further, articulating tractor 12 can pull with more force than hose 44 can withstand without a noticeable effect on tractor 12. Therefore, the force on hose 44 must be monitored to prevent damage to hose 44. FIG. 5 is an enlarged view of tow gauge 80, such as a cylinder or hydraulic cylinder, which measures the amount of force exerted on drag hose 44. Tow gauge 80 extends between first boom segment 36A and second boom segment 36B of boom 36, and includes first and second flanges 82A, 82B, first and second fasteners 84A, 84B, piston 86 and rod 88. Piston 86 is mounted to first boom segment 36A by first flange 82A and first fastener 84A. Rod 88 is mounted to second boom segment 36B by second flange 82B and second fastener 84B.

Rod 88 fits within piston 86 to form a hydraulic cylinder and slidably connect first boom segment 36A and second boom segment 36B. As the force on hose 44 increases, first boom segment 36A and second boom segment 36B are pulled apart, and rod 88 is pulled, generating pressure on piston 86. Thus, the pressure on piston 86 measures the force on hose 44. The measurement from tow gauge 80 can be displayed on a monitor visible to the operator of the system 10, such as tow gauge display 53 of FIG. 1 or on a display in cab 22. Allowing too much force on hose 44 can result in failure of hose 44. For example hose 44 can tear or break free from boom assembly 30. This results in discharging wastewater, and replacing the expensive hose. Tow gauge 80 allows the operator to maintain a force on hose 44 below a specified value.

Hose drag system 10 improves the application flow rate and decreases the application time. By reducing flow impediments, hose drag system 10 produces a higher or improved application rate. For example, tests have demonstrated an application rate of at least 2,700 gallons per minute, with 3,000 gallons per minute a foreseeable and reachable goal. In comparison, previous hose drag systems were typically capable of up to 1,200 gallons per minute. The increased application rate enables a greater amount of wastewater to be applied during the same time period. The increased application flow rate also enables a wider distribution pattern and applicator assembly 46 to be used. This reduces the number of passes necessary, which further reduces the application time, and reduces wear and required maintenance on the parts of system 10, such as hose 44.

In addition to the increased flow rate, system 10 also has a reduced pressure. For example, tests have demonstrated about a 15%-20% pressure reduction in hose 44 with about a 15%-20% increase in flow rate. Such pressure reduction increases the failure margin hose 44 is operated at and positively affects the pumping equipment used to pump the wastewater from the storage site to tractor 12.

Boom assembly 30 further decreases application time and machine wear by allowing hose drag system 10 to continue in a forward motion at the end of the field. Typical manure applicators are pulled behind a tractor by a three-point hitch. With these systems, the tractor must make a generally Y-shaped Y-turn at the end of the field to create slack in the hose in order to prevent pinching or damaging the hose. A Y-turn involves reversing the tractor for a short distance before continuing in a forward motion in order to reduce the resistance of the hose and enable the tractor to turn. The Y-turn enables the hose to make a smooth, rounded corner such as in a serpentine pattern. However, the Y-turn involves repeated hurried or rushed reversing which is hard on the tractor's transmission. The Y-turn also requires a higher amount of operator concentration. Further, the Y-turn results in higher application concentrations at the ends of the field, and typically the maximum flow potential through the system is limited to control the amount of puddling or the application rate at the ends of the field.

The location of pivot point 42 improves the maneuverability and handling of hose drag system 10, and allows tractor 12 to turn at the end of a row in one fluid motion. By locating pivot point 42 ahead of rear axle 26, tractor 12 controls boom 36 and hose 44 instead of hose 44 controlling tractor 12. As explained above, due to the location of pivot point 42, boom 36 and hose 44 swing into the turn and enhance the tuning rather than leveraging against tractor 12. Allowing continued forward motion through turns eliminates the necessity of Y-turns and reduces transmission wear in system 10.

Additionally, four-wheel drive articulating tractors, such as articulating tractor 12, do not include individual rear brakes. Because boom 38 assists tractor 12 during turning, the geometry of hose drag system 10 allows articulating tractor 12 to turn without brakes.

Although the tractor 12 has been described as pulling applicator assembly 46 containing an opener, such as discs, tractor 12 can alternatively surface apply the wastewater without further working it into the ground, or tractor 12 can carry an injector applicator or a drop hose applicator. If tractor 12 carries an injector applicator or a drop hose applicator, splash box 60 is not used. Thus, although the broadcast width of splash box 60 is not relevant for these types of applicators, the flow rate of wastewater remains an important factor, because higher flow rates allow the same application concentration to be applied at higher field speeds. Therefore, it is also preferable to increase the flow rate of wastewater through hose drag systems containing injector applicators or a drop hose applicators. Further, such systems also benefit from the improved handling and maneuverability of system 10 due to the location of pivot point 42, and the reduced pressure on hose 44.

Although the present invention has been described with reference to preferred embodiments, workers skilled in the art will recognize that changes may be made in form and detail without departing from the spirit and scope of the invention.

The invention claimed is:

1. An apparatus for application of a liquid or liquid-solid solution to soil, the apparatus comprising:
   a four-wheel drive articulating tractor having a front portion and a rear portion connected to an articulation point that allows articulated movement of the front portion and the rear portion in relation to one another, the rear portion having a driven rear wheel axle and the front portion having a driven front wheel axle;
   a frame adapted to mount on the rear portion of the articulating tractor, the frame having a front frame end and a rear frame end, the front frame end at a location between the rear wheel axle and the articulation point, and the rear frame end opposite the frame front end and rearward of the rear wheel axle;
   a pivot point at the front frame end and positioned about 12 inches or more forward from the rear wheel axle;
   a boom pivotally attached to the pivot point so that the boom can pivot along a substantially horizontal plane about a vertical axis; and
   a drag hose having a distal end and a proximal end, the distal end in fluid communication with a source of liquid or solid-liquid solution, and the proximal end coupled to the boom.

2. The apparatus of claim 1, wherein the pivot point is about 16 inches or more from the rear wheel axle.

3. The apparatus of claim 1, wherein the pivot point is closer to the articulation point than to the rear wheel axle.

4. The apparatus of claim 1, and further comprising a tow gauge to measure force on the drag hose.

5. The apparatus of claim 1, wherein the boom comprises:
   a first section;
   a second section; and
   a cylinder connecting the first section and the second section and configured to measure force on the drag hose.

6. The apparatus of claim 5, wherein the cylinder is a hydraulic cylinder.

7. The apparatus of claim 5, wherein the boom further comprises:
   a plurality of boom segments; and
   a knuckle configured to permit limited horizontal and vertical movement of the boom segments.

8. The apparatus of claim 1, and further comprising:
a liquid or solid-liquid solution applicator connected to the rear portion of the tractor; and
a liquid or solid-liquid solution flow path extending from the drag hose through the boom to the applicator, wherein the flow path contains three or less turns of about 90 degrees or less to minimize flow restrictions on the liquid or solid-liquid solution.

9. The apparatus of claim 8, wherein the liquid or solid-liquid flow path comprises:
a first substantially horizontal flow path;
a first substantially vertical flow path connected to the first substantially horizontal flow path at a first turn;
a second substantially horizontal flow path connected to the first substantially vertical flow path at a second turn; and
a flow meter located in the second substantially horizontal flow path.

10. The apparatus of claim 9, wherein the vertical flow path has a larger inner diameter than the first substantially horizontal flow path and the second substantially horizontal flow path.

11. The apparatus of claim 10, wherein the vertical flow path has an inner diameter of at least about 5 cm larger than the inner diameters of the first substantially horizontal flow path and the second substantially horizontal flow path.

12. The apparatus of claim 1, wherein the boom comprises:
boom segments; and
a knuckle configured to permit limited horizontal movement of a selected boom segment about a vertical axis.

13. The apparatus of claim 12, wherein the knuckle permits the selected portion of the boom to horizontally pivot up to about 30 degrees from center about the vertical axis.

14. The apparatus of claim 12, and further comprising:
a liquid or solid-liquid solution applicator connected to tractor; and
a liquid or solid-liquid solution flow path extending from the drag hose through the boom to the applicator, wherein the flow path contains three or less turns of about 90 degrees or less to minimize flow restrictions on the liquid or solid-liquid solution.

15. The apparatus of claim 12, wherein the pivot point is closer to the articulation point than to the rear axle.

16. The apparatus of claim 12, wherein the boom further comprises a hydraulic cylinder configured to measure force on the drag hose.

17. The apparatus of claim 1, wherein the boom comprises:
boom segments; and
a knuckle configured to permit limited vertical movement of a selected boom segment about a horizontal axis.

18. The apparatus of claim 17, wherein the knuckle permits the selected portion of the boom to vertically pivot up to about 20 degrees from center about the horizontal axis.

19. The apparatus of claim 17, and further comprising:
a liquid or solid-liquid solution applicator connected to tractor; and
a liquid or solid-liquid solution flow path extending from the drag hose through the boom to the applicator, wherein the flow path contains three or less turns of about 90 degrees or less to minimize flow restrictions on the liquid or solid-liquid solution.

20. The apparatus of claim 17, wherein the pivot point is closer to the articulation point than to the rear axle.

21. The apparatus of claim 17, wherein the boom further comprises a hydraulic cylinder configured to measure force on the drag hose.

22. The apparatus of claim 17, wherein the knuckle is further configured to permit limited horizontal movement of a second selected boom segment about a vertical axis.

* * * * *